May 21, 1940.  R. B. BEISEL ET AL  2,201,710
AIRPLANE CONTROL
Filed June 25, 1938  2 Sheets-Sheet 2

INVENTOR.
Rex B. Beisel and
Paul S. Baker
BY Harris G. Luther
ATTORNEY

Patented May 21, 1940

2,201,710

UNITED STATES PATENT OFFICE 2,201,710

AIRPLANE CONTROL

Rex B. Beisel and Paul S. Baker, West Hartford, Conn., assignors to United Aircraft Corporation, East Hartford, Conn., a corporation of Delaware Application June 25, 1938, Serial No. 215,892

18 Claims. (Cl. 244—83)

This invention relates to improvements in airplane controls and has for an object the provision of improved control means including a plurality of control instrumentalities which may be selectively utilized, either individually or in combination, to control the airplane.

A further object resides in the provision, in a control means of the character specified, of an improved changeover mechanism for selectively transferring the control of the airplane from one of a plurality of control instrumentalities to another.

A more specific object resides in the provision, in an airplane having both ailerons and lift spoilers for lateral control, of manually controllable means for diminishing the controlling effect of one of said lateral control instrumentalities while simultaneously increasing the controlling effect of the other.

Other objects and advantages will be more particularly pointed out hereinafter or will become apparent as the description proceeds.

In the accompanying drawings in which like reference numerals are used to designate similar parts throughout there is illustrated a suitable mechanical construction for the purpose of exemplifying the invention. The drawings, however, are for the purpose of illustration only and are not to be taken as in any way limiting or restricting the invention as set forth in the appended claims.

In the drawings

Figure 1:
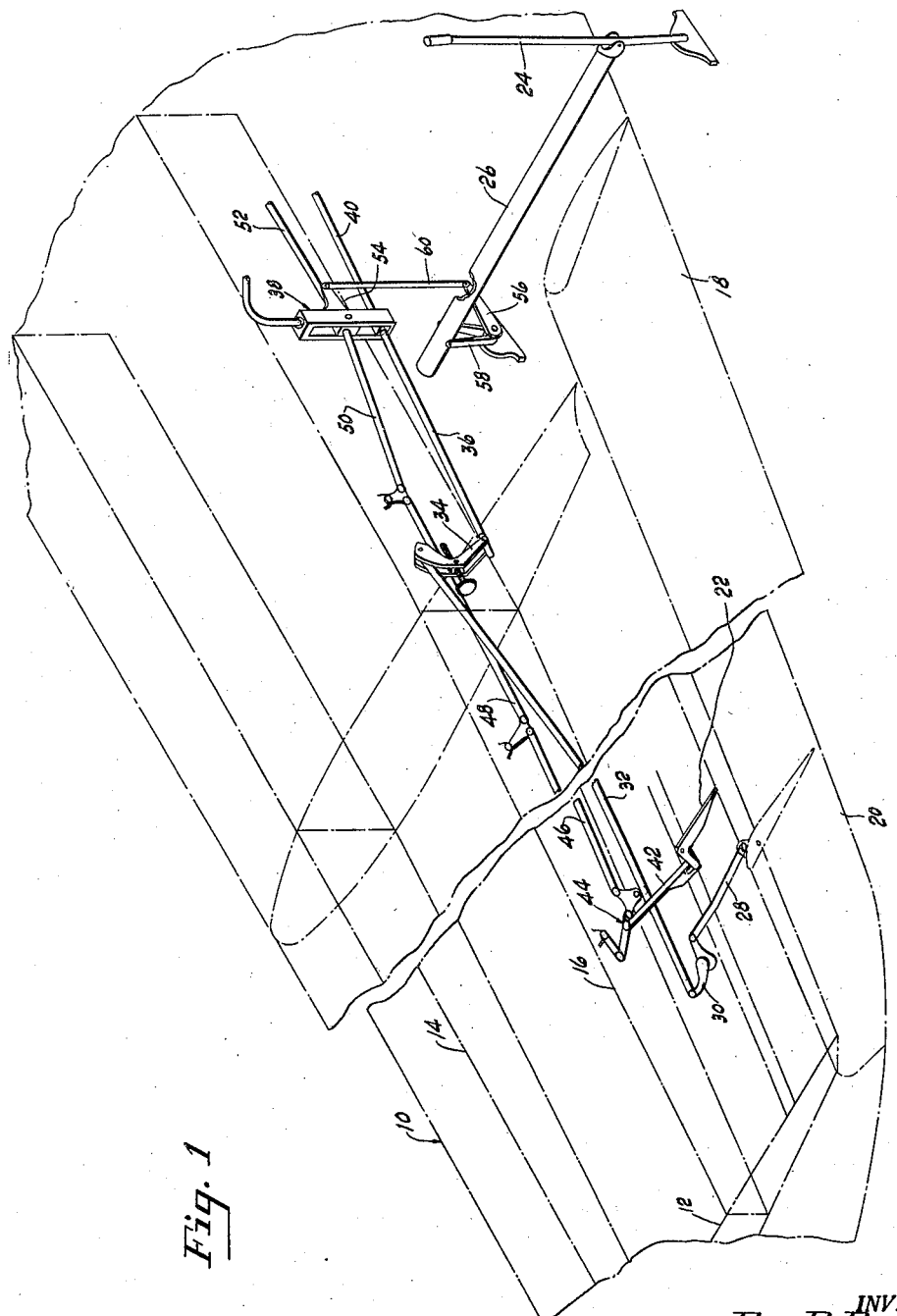
Fig. 1 is a diagrammatic perspective view of an airplane wing showing a lateral control arrangement and control changeover device, constructed according to the invention, applied thereto.

Referring to the drawings in detail and particularly to Fig. 1, the numeral 10 generally indicates an airplane wing having ribs 12 and spars or stiffeners 14 and 16. The wing is provided with a lift increasing trailing edge flap 18 and has for lateral control the aileron 20 and the lift spoiler flap 22 cooperating with a wing slot in a manner well known to the art.

As an incident to recent improvements in airplane speed and performance and the excessively high wing loading now ordinarily used, it has become common practice to provide such high performance airplanes with lift increasing devices, particularly in the nature of lift increasing wing flaps, to avoid unsafe landing speeds. Such a lift increasing wing flap is particularly illustrated and described in Patent No. 2,117,607, issued May 17, 1938, to R. W. Griswold, II, for Slotted deflector flap.

Where an airplane is equipped with ailerons along the trailing edge of the wing, it has not been possible to extend the lift increasing flap for more than the portion of the wing span between the ailerons. As the ailerons occupy a considerable portion of the total wing span it has been possible to obtain only a fraction of the theoretical maximum lift increase by the addition of the lift increasing wing flap. While the lift increase provided by such a flap between the ailerons is highly beneficial, there are some cases in which the amount of lift increase thus obtained is not sufficient to reduce the landing speed by the desired amount. Obviously the lift of the wing could be materially improved by inclining or drooping the ailerons at the same time the flap is inclined to thus provide, in effect, a total span lift-increasing flap. The objection to this arrangement has been that when the ailerons are sharply inclined or drooped to provide a lift-increasing effect for the wing they become, to a considerable degree, useless for lateral control purposes. As the maximum efficiency in lateral control is required when the airplane is flying at very slow speeds it has been found impossible to obtain anything near the maximum theoretical lift increase from drooped ailerons while continuing to use the ailerons as lateral control devices. In the construction illustrated this difficulty has been overcome by providing additional lateral control devices in the form of lift spoilers which can be operated independently of the ailerons so that when the ailerons are drooped to increase the lift of the wing the lateral control of the airplane is accomplished by the spoilers. As the spoilers do not function quite as satisfactorily as ailerons at high speeds, it becomes desirable to use the ailerons for lateral control when the airplane is flying at relatively high speeds and to use the spoilers for lateral control mainly when the airplane is flying at very low speeds with the wing flap and ailerons drooped to provide the maximum lift. It is also part of the present invention to especially design the ailerons for use as lateral control devices under high-speed conditions and to specially design the lift spoilers for use as lateral control devices under slow speed conditions.

In order that the lateral control may be by the ailerons under high-speed flight conditions and by the spoilers under low-speed flight conditions it becomes necessary to provide some effective means for changing the lateral control from one to the other of these instrumentalities while the airplane is in flight.

In the construction illustrated lateral control of the airplane is accomplished by sideways movement of the control column 24 transmitted through the torque tube 26 of the lateral control linkage. The aileron 20 is connected by the link 28, the bell crank 30, the link 32, the adjustable fulcrum lever 34 and the link 36 to one side of the device generally indicated at 38. As is more fully described in application Serial No. 212,996, filed June 10, 1938, by Frank C. Albright for Aircraft control means, the device 34 is operative to droop the ailerons to change their function from that of lateral control to that of increasing the lift coefficient of the wing. This device is in the form of a pivoted lever for imparting movement to the links connected thereto in the manner hereinafter described. The opposite aileron is connected by similar elements including the link 40 to the opposite side of the device 38. The spoiler 22 is connected by the link 42, the toggle mechanism generally indicated at 44 and which is described in detail in application Serial No. 214,486, filed June 18, 1938, by Rex B. Beisel for Airplane control devices, and the links 46, 48 and 50 are connected to the same side of the device 38 as that to which the aileron 20 is connected. The opposite spoiler is connected to the opposite side of the mechanism by a similar system of links and levers including the link 52. As is clearly illustrated in Fig. 1, the attachment points of the links 36 and 50 to the device 38 are spaced apart along the length of the device and the attachment point of the links 40 and 52 are similarly spaced. The device 38 is pivoted at or adjacent to its center to a fixed portion of the airplane and is inclined in opposite directions upon lateral movement of the control column 24, through a connection with the torque tube 26, which connection includes an arm 54 on the device, an arm 56 connected to the torque tube by a bracket 58, and link 60 connecting the free end of the arms 54 and 56.

From the above description it will be apparent that if the connecting points of the links 50 and 52 are opposite the pivotal mounting of the device 38 they will receive no material movement from the device when the device is tilted by lateral movement of the control column while the links 36 and 40 being, as illustrated, remote from the pivotal mounting will receive nearly all of the movement imparted to the device 38 by the operation of the control column. Thus with the position of the parts as illustrated in Fig. 1, the ailerons will be operated to provide lateral control upon sideway movement of the control column 24 but the spoilers will not be operated. If these conditions are reversed so that the links 36 and 40 are at or adjacent to the pivotal mounting and the links 50 and 52 are remote therefrom the movement imparted to the device 38 by the ailerons will not be moved to a material extent. If neither the links 50 and 52 or the links 36 and 40 are near or opposite the pivotal mounting of the device 38 both the spoilers and ailerons will be moved and the controlling effect of each will be determined by the respective distances between their operating links and the axis of the pivotal mounting of the device 38. In changing from one type of control to the other a transitional period occurs in which flight control of the airplane is accomplished by both devices, the contribution of each at any point in the transition from one to the other being approximately directly proportional as to one device and approximately inversely proportional as to the other, to the amount the nuts 84 and 86 are moved from their position at the start of the control transition to the total amount of movement necessary to entirely transfer the control function from one device to the other. The control devices and the transfer mechanism are so designed and arranged that, at any point in the transition range the control action, with both control devices in operation, is substantially the same as the control action with only one control device operative, and so that the control power at any point in the transition range is never below a minimum entirely adequate for the control of the airplane.

Figure 2:
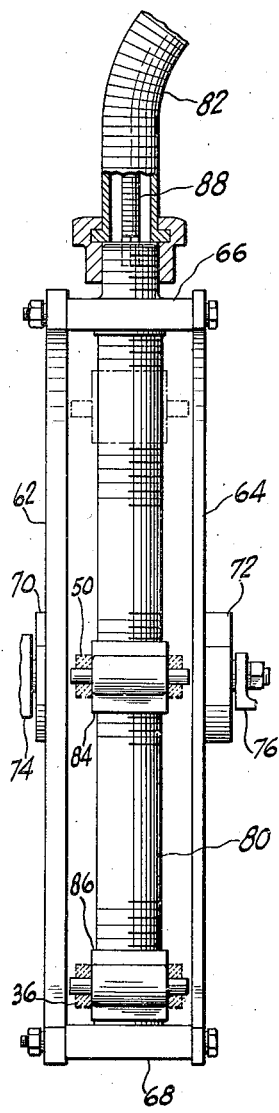
Fig. 2 is a side-elevational view of the changeover mechanism.
Figure 3:
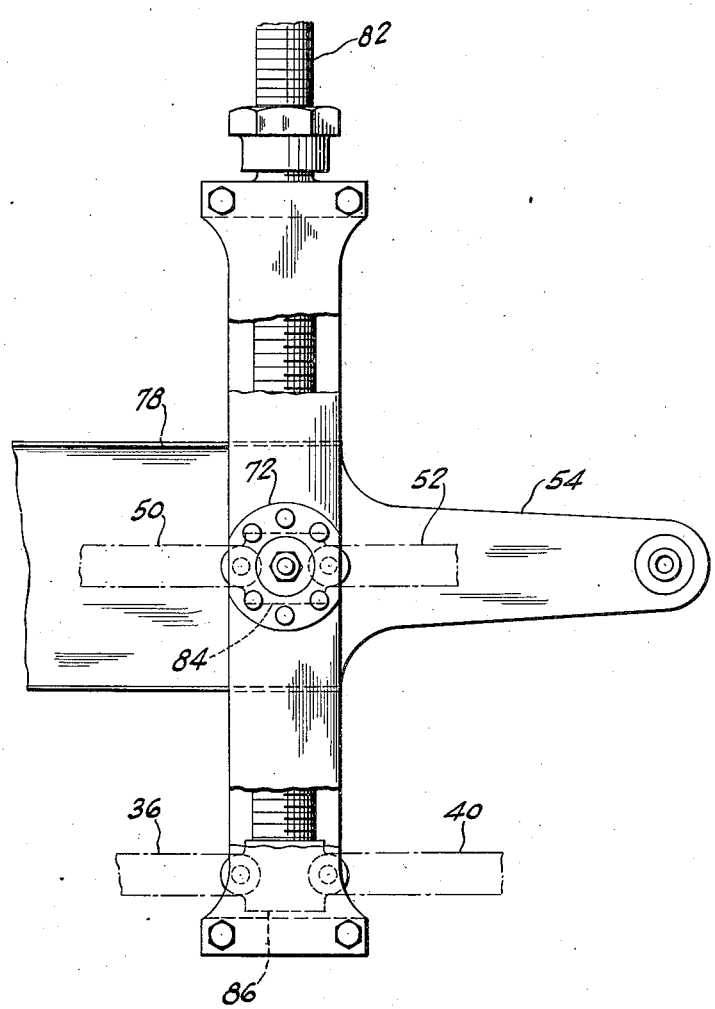
Fig. 3 is an elevational view of the changeover mechanism when rotated 90 degrees from the position illustrated in Fig. 2.

The changeover device, generally indicated at 38, is particularly illustrated in Figs. 2 and 3. As illustrated, this device includes a frame comprising a pair of side plates 62 and 64 secured together at their ends by abutments 66 and 68 and provided at their midportions with bearings 70 and 72 by which the device is pivotally supported by the axles 74 and 76 upon the fixed member 78 of the airplane. A screw-threaded shaft 80 is disposed between the plates 62 and 64 and rotatably supported at its ends in the abutments 66 and 68. This shaft 80 is rotated by a flexible drive 82 secured at one end to the adjacent end of the shaft 80 and to the abutment 66, and at its opposite end, either directly or indirectly, to a suitable manually controllable operating device. A pair of screw-threaded blocks or nuts 84 and 86 are threaded onto the shaft 80 and spaced apart a distance approximately one-half of the length of the shaft so that when the block 84, for example, is in line with the axis of the axles 74 and 76 the block 86 will be at the lower end of the shaft 80 adjacent to the abutment 68, and when the block 86 is in line with the axis of the axles 74 and 76 the block 84 will be at the upper end of the shaft 80 adjacent to the abutment 66, as indicated in broken lines in Fig. 2. As is particularly illustrated in Fig. 3, the ends of the links 36 and 40 are pivotally connected to the block 86 and the ends of the links 50 and 52 are pivotally connected to the block 84. Preferably the action of the devices 34 and 38 is coordinated in such a manner that the effectiveness of the spoilers is automatically increased as the ailerons are drooped. This may be accomplished by mechanically or otherwise connecting the adjusting screw in member 34 with the adjusting shaft 80 of the changeover device 38 so that as the ailerons are drooped the changeover device is actuated to gradually transfer the lateral control function from the ailerons to the spoilers.

From this description it will be observed that the lateral control may be changed over from the ailerons to the spoilers and vice-versa by turning the cable 88 of the flexible drive 82 in the proper direction.

A suitable arrangement for operating the changeover mechanism for coordinating the operation of the changeover mechanism with the operation of other lift increasing and lateral control instrumentalities is particularly illustrated and described in application Serial No. 212,996, filed June 10, 1938, by Frank C. Albright, for Aircraft control means, to which reference may be had for a further description of the construction and operation of the complete lateral control and lift increasing arrangement.

While a particular constructional arrangement of a changeover mechanism for selectively useable control instrumentalities has been illustrated and described for the purpose of disclosing the invention it is to be understood that the invention is not limited to the particular construction so illustrated and described but that various changes in the size, shape and arrangement of parts may be resorted to and that a hydraulic or electrically operated mechanism could be used to accomplish the functions of the mechanically operated mechanism herein illustrated and described without in any way exceeding the scope of the invention.

Having now described the invention so that others skilled in the art may clearly understand the same, what it is desired to secure by Letters Patent is as follows.

What is claimed is:

1. In an aircraft having wings and selectively useable control instrumentalities associated with said wings for performing the same flight control function, a single manually actuatable control means for operating said instrumentalities, and means for operatively connecting said manually actuatable means with one or the other of said instrumentalities.

2. In an airplane having a plurality of groups of movable control surfaces for performing the same flight control function, pilot actuated means for operating both groups of said surfaces, and pilot controlled group selecting means for progressively shifting said flight control function from one to another of said groups of control surfaces while continuously maintaining said flight control function of said surfaces.

3. In an airplane having different groups of movable flight control instrumentalities mounted directly on fixed parts of said airplane for performing the same flight control function under different flight conditions, means for operating said instrumentalities, and means for rendering a selected group effective to perform said flight control function and for simultaneously locking the instrumentalities of another group in a predetermined position.

4. In an airplane having wings, two different groups of flight control instrumentalities associated with said wings for performing the same flight control function under different respective flight conditions, single manually controllable means for operating both groups of said instrumentalities, and means operative to increase the flight control effectiveness of one group under the actuation of said manual means and simultaneously decrease the flight control effectiveness of the other while continuously maintaining the total flight control effect substantially unchanged.

5. In an airplane having two different groups of flight control instrumentalities for performing the same flight control function under respectively different flight conditions, means for operating said instrumentalities including a plurality of link members both connected at their ends to a unitary fixed fulcrum lever member, and a manually operable member permanently associated with said lever in the same operative relationship for transferring said flight control function from one of said groups of instrumentalities to the other comprising means operable by the airplane pilot during flight for changing the position of the ends of said links with respect to said fulcrum.

6. In an airplane having one pair of lateral control surfaces for use under certain flight conditions and a second pair of lateral control surfaces for use under other flight conditions, means for operating said lateral control surfaces to provide lateral control for said airplane and for transferring the lateral control function from one pair of lateral control surfaces to the other comprising, a manual control, a lever member tiltable by said manual control about a centrally disposed fixed fulcrum and permanently connected with said manual control, a respective link operatively connecting each lateral control surface with said lever, said links being connected to said lever in pairs, and means for changing the distance between said link connections and said lever pivot.

7. In an airplane having one pair of lateral control surfaces for use under certain flight conditions and a second pair of lateral control surfaces for use under other flight conditions, means for operating said lateral control surfaces and for transferring the lateral control function from one pair to the other comprising, a manual control, a lever member tiltable by said manual control about a centrally disposed fixed fulcrum, a pair of movable blocks carried by said lever spaced apart substantially one-half the length of said lever, links connecting said blocks respectively with said pairs of control surfaces, and a screw shaft threaded through said blocks and rotatable under manual control to move said blocks along said lever to change their position with respect to said fixed fulcrum.

8. In an airplane, a set of ailerons for lateral control, a set of lift spoiler flaps for lateral control, a single manually operable device for controlling both the ailerons and the lift spoiler flaps, and a change-over mechanism for transferring the lateral control function from said lift spoilers to said ailerons or vice-versa and having in its operation a transitional period during which the ailerons and lift spoiler flaps function together to provide lateral control for said airplane, said mechanism and said ailerons and lift spoiler flaps being so constructed and arranged that there is no substantial diminution in the effectiveness of the lateral control during said transitional period.

9. In an airplane, two sets of movable lateral control surfaces, a single manually operable element for effecting lateral control of said airplane, and a mechanism for transferring the lateral control function from one set of control surfaces to the other, said mechanism having in its operation a transitional range during which both sets of control surfaces are operative to provide lateral control for said airplane, said mechanism and said surfaces being so constructed and arranged that at any point in said transitional range when both sets of control surfaces are operative, the control action is substantially the same as when only one set of said surfaces is operative.

10. In combination with an airplane and a wing for supporting said airplane in flight, ailerons operatively associated with said wing to provide lateral control for said airplane, lift spoilers operatively associated with said wing to provide lateral control for said airplane, means for decreasing the lateral control effectiveness of either of said lateral control devices while simultaneously increasing the effectiveness of the alternative device substantially proportionately, and manually actuatable means for operating said lateral control devices.

11. In combination with an airplane and a wing for supporting said airplane in flight, means associated with said wing operative to increase the lift thereof, lift spoilers operatively associated with said wing for providing lateral control for said airplane, and means for increasing the lateral control effectiveness of said lift spoilers as said lift increasing devices are put into operation.

12. In combination with an aircraft having a wing provided with lift increasing devices, a pair of manually operable lift spoilers associated with said wing to provide lateral control for said airplane, and means rendering said lift spoilers substantially inoperative except when said lift increasing devices are operative to increase the lift of said wing.

13. In combination with an aircraft having a sustaining wing, ailerons and lift spoilers operatively associated with said wing for lateral control of said airplane, means operative to decrease the lateral control effectiveness of said ailerons, and means for increasing the lateral control effectiveness of said lift spoilers as the effectiveness of said ailerons is lost.

14. In combination with an airplane and a sustaining wing therefor, a set of lateral control devices designed for use under high-speed flight conditions operatively associated with said wings, a second set of lateral control devices designed for use under slow speed flight conditions also operatively associated with said wing, pilot actuated means for operating both sets of devices and means operative to progressively transfer the lateral control function from one set of lateral control devices to the other.

15. In combination with an airplane and a wing for supporting said airplane in flight, ailerons operatively associated with said wing to provide lateral control for said airplane, lift spoilers operatively associated with said wing to provide lateral control for said airplane, means for changing the function of said ailerons from said lateral control function to a wing lift coefficient increasing function, and means for increasing the lateral control effect of said lift spoilers as the lateral control effect of said ailerons decreases.

16. In combination with an airplane and a wing for supporting said airplane in flight, ailerons operatively associated with said wing to provide lateral control for said airplane, lift spoilers operatively associated with said wing to provide lateral control for said airplane, means for changing the function of said ailerons from said lateral control function to a wing lift coefficient increasing function, and means for increasing the lateral control effect of said lift spoilers as the lift coefficient increasing effect of said ailerons progresses.

17. In an airplane having selectively useable groups of flight control instrumentalities, common means for operating both said groups of flight control instrumentalities, and means for gradually shifting the flight control function from one group to another of said instrumentalities having in its operation a transitional range during which both groups of control instrumentalities are operative, said means and said instrumentalities being so constructed and arranged that at any point in said transitional range when both groups of control instrumentalities are operative the control action is substantially the same as when only one group of said instrumentalities is operative.

18. In an airplane, in combination, ailerons having means for drooping the same to increase the lift of the airplane, means for moving said ailerons to control said airplane, lift spoilers, means for moving said lift spoilers to control said airplane, and pilot controlled means connecting said aileron moving means and said lift spoiler moving means for selecting the control to be used and rendering the alternative control means substantially inoperative for control purposes, said means being constructed and arranged so that as the ailerons are drooped the proportion of control by the lift spoilers may be increased and the proportion of control by the ailerons may be decreased.

REX B. BEISEL.
PAUL S. BAKER.